Patented Apr. 8, 1924.

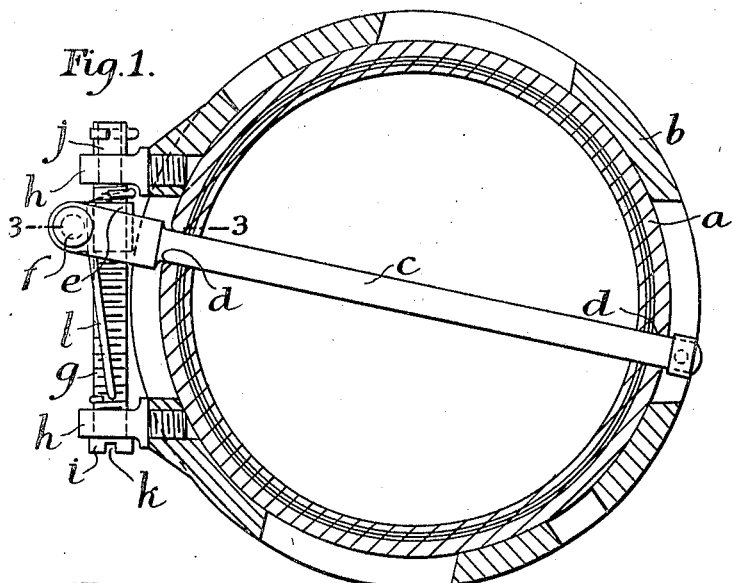
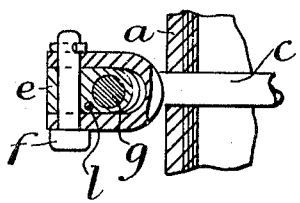
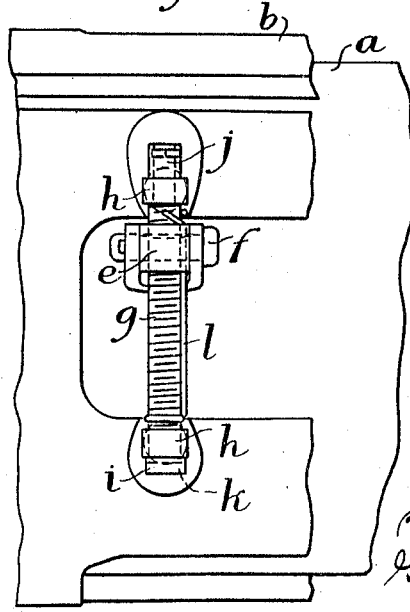

1,489,258

UNITED STATES PATENT OFFICE.

HENRY LEITNER, OF LONDON, ENGLAND.

SCREW PROPELLER.

Application filed July 20, 1923. Serial No. 652,821.

*To all whom it may concern:*

Be it known that I, HENRY LEITNER, a subject of the King of Great Britain, residing at Regent House, Kingsway, London, England, have invented new and useful Improvements in Screw Propellers, of which the following is a specification.

My invention relates to screw-propellers primarily designed for use with aircraft and to the type of propeller in which the roots or butts of the blades are carried in sockets or bearings in the hub so as to be detachable and adjustable for pitch angle.

Now, the object of my invention is to provide means for adjusting and setting the pitch angle of each blade and allow of its removal from the propeller hub and replacement therein without disturbing or interfering with the pitch angle setting and to this end I provide each propeller blade with a pin passing through diametrically opposed holes in the root or butt, the pin at one end being pivoted to a nut. Through this nut passes an adjusting screw, carried at each end in a bearing, for instance, an eyebolt on the propeller hub and serving, when rotated, to cause the pin to turn the root or butt of the blade in its socket so as to alter the pitch angle of the blade.

Suitable means are provided for locking the nut to the adjusting screw after adjustment, for instance, a wire passing through holes in both the nut and the screw, so that a blade can be readily assembled or dismantled without interfering with the adjustment.

To enable the invention to be fully understood I will describe it by reference to the accompanying drawing, in which:—

Figure 1 is a transverse section through the root or butt of a screw-propeller blade adjustable for pitch, and the socket or bearing therefor in the propeller hub, showing the improved means for effecting such adjustment.

Figure 2 is a plan of the same and

Figure 3 is a section on the line 3—3, Figure 1.

$a$ is the root or butt of the propeller blade and $b$ is the socket or bearing therefor on the propeller hub and in which the said butt or root can be rotated when adjusting for pitch.

$c$ is the pin passing through the diametrically opposed holes $d$ in the root or butt $a$, and $e$ is the nut to which it is pivoted as at $f$, the said pin being shown with a bifurcation to embrace the said nut. $g$ is the adjusting screw which engages with the thread of the said nut and which is mounted at its ends and is rotatable in the bearings $h$. In the drawing these bearings are in the form of eye-bolts screwed into the socket $b$, but they may be formed integral with the said socket. $i$ is a head on one end of the screw $g$ and $j$ is a ferrule on the other end to prevent endwise movement of the said screw, and $k$ is a nick in the head $i$ to enable the screw to be rotated by a screw-driver or similar tool. Or, the head $i$ can be otherwise formed to allow of the application of a tool for rotating the screw.

By the described construction it will be seen that if the screw $g$ be rotated in either direction, the nut $e$ will be correspondingly traversed along the said screw and move the pin $c$ to effect a rotation of the root or butt $a$ to obtain the desired alteration of pitch of the propeller blade, the pin $c$ owing to its direct connection to the nut $e$ being caused to move slightly longitudinally in the holes $d$.

$l$ is the wire which I employ to secure or lock the nut $e$ to the screw $g$, after adjustment, the said wire being passed through holes in the said nut and screw and then being bent as indicated to secure it in position. By thus locking these parts together it will be seen that a blade can be readily assembled or dismounted without interfering with the adjustment.

Claims:

1. A propeller arrangement of the class described, including a root, a root socket, adjustable means pivotally connected to said socket extending through and secured to said root, for rotating the root in said socket, thereby adjusting the pitch of said propeller.

2. A propeller arrangement as claimed in claim 1, wherein said adjusting means extend through diametrically opposed apertures in said root.

3. A propeller arrangement of the class described, including a root, a root socket, a plurality of bearings on said root socket, a threaded member journalled in said bearings, a threaded lug engaging said threaded member, a pin pivoted to said lug and extending through apertures in said root, whereby said root may be rotated in said socket by rotating said threaded member in its bearings.

4. A propeller arrangement as claimed in claim 3, wherein means are employed for locking said arrangement in adjustment.

5. A propeller arrangement as claimed in claim 3, wherein said bearings consist of eye bolts secured to said socket, and said threaded member is in the form of a screw, having a slotted head for adjustment, said lug and screw being provided with apertures, through which a wire is passed for locking.

HENRY LEITNER.